(12) United States Patent
An (10) Patent No.: US 10,428,799 B2
(45) Date of Patent: Oct. 1, 2019

(54) WIND POWER GENERATION SYSTEM USING JET STREAM

(71) Applicant: Kwangwoo An, Federal Way, WA (US)

(72) Inventor: Kwangwoo An, Federal Way, WA (US)

( * ) Notice: Subject to any disclaimer, the term of this patent is extended or adjusted under 35 U.S.C. 154(b) by 0 days.

(21) Appl. No.: 16/336,367

(22) PCT Filed: Nov. 29, 2017

(86) PCT No.: PCT/KR2017/013823
§ 371 (c)(1),
(2) Date: Mar. 25, 2019

(87) PCT Pub. No.: WO2018/147535
PCT Pub. Date: Aug. 16, 2018

(65) Prior Publication Data
US 2019/0257291 A1    Aug. 22, 2019

(30) Foreign Application Priority Data
Feb. 7, 2017  (KR) .......................... 10-2017-0016756

(51) Int. Cl.
*F03D 9/32*     (2016.01)
*F03D 13/20*    (2016.01)
(Continued)

(52) U.S. Cl.
CPC .................. *F03D 9/32* (2016.05); *B64B 1/62* (2013.01); *F03D 1/06* (2013.01); *F03D 9/11* (2016.05);
(Continued)

(58) Field of Classification Search
CPC .................................. F03D 9/32; H02J 50/30
See application file for complete search history.

(56) References Cited

U.S. PATENT DOCUMENTS

| 2004/0142733 A1* | 7/2004 | Parise | B01F 5/0614 455/572 |
| 2007/0274226 A1* | 11/2007 | Tillotson | H02J 17/00 370/252 |
| 2015/0041598 A1* | 2/2015 | Nugent | H02J 17/00 245/53 R |

FOREIGN PATENT DOCUMENTS

JP        07-236204 A    9/1995
KR   10-2006-0114773 A   11/2006
(Continued)

*Primary Examiner* — Daniel J Cavallari
(74) *Attorney, Agent, or Firm* — Novick, Kim & Lee, PLLC; Sang Ho Lee (57) ABSTRACT

Provided is a wind power generation system using a jet stream. The wind power generation system is implemented to include a flight vehicle configured to produce power through wind power generation while floating in the air and autonomously flying without a winch and configured to transmit the produced power to the ground, and a ground reception unit configured to receive a power signal transmitted from the flight vehicle and convert the power signal to electricity, wherein the flight vehicle enters a power generation location or escapes from the power generation location through buoyancy adjustment, the flight vehicle produces power through wind power generation while staying at the top of the troposphere or in the vicinity of the stratosphere where the jet stream is generated, and the flight vehicle includes a propeller configured to rotate in one direction due to the jet stream, a power generator configured to produce power by converting mechanical energy due to a rotational force of the propeller to electrical energy, a power generation control unit configured to control entry or escape into or from the power generation location, a buoyancy adjustment unit configured to increase or decrease buoyancy according to control of the power generation control unit, a laser conversion unit configured to convert power produced (Continued)

by the power generator to a laser, and a laser shooting unit configured to transmit the laser converted by the laser conversion unit to the ground.

9 Claims, 7 Drawing Sheets

(51) Int. Cl.
  *F03D 9/11* (2016.01)
  *F03D 1/06* (2006.01)
  *H02K 7/18* (2006.01)
  *H02J 50/30* (2016.01)
  *B64B 1/62* (2006.01)

(52) U.S. Cl.
  CPC .............. *F03D 13/20* (2016.05); *H02J 50/30* (2016.02); *H02K 7/183* (2013.01); *F05B 2240/922* (2013.01); *F05B 2260/42* (2013.01); *F05B 2270/18* (2013.01)

(56) References Cited

FOREIGN PATENT DOCUMENTS

| | | |
|---|---|---|
| KR | 10-0933514 | 12/2009 |
| KR | 10-2011-0026314 | 3/2011 |
| KR | 10-2011-0108633 A | 10/2011 |
| KR | 10-2013-0002080 A | 1/2013 |
| KR | 20-2014-0001293 U | 3/2014 |
| KR | 10-2014-0111414 | 9/2014 |

\* cited by examiner

WIND POWER GENERATION SYSTEM USING JET STREAM

TECHNICAL FIELD

The present invention relates to a wind power generation system, and more particularly, to a wind power generation system using a jet stream that is capable of producing power by generating wind power using a jet stream without using a winch, converting the wind power to a laser, transmitting the laser to the ground, and then converting the laser to electricity on the ground.

BACKGROUND ART

General wind power generation uses wind on the ground, but because the wind on the ground is not fast and does not blow at all times, there is a limitation in increasing the output such that the power generation efficiency drops, and time during which power generation is possible throughout the year is limited. Particularly, there are many environmental problems such as damage to forests for transportation and installation, noise, or the like.

Meanwhile, at the top of the troposphere, there is always a strong westerly wind in a constant direction due to the effect of the Earth's rotation. This wind is referred to as a jet stream.

In this way, because a strong wind blows in the vicinity of the top of the troposphere at all times, abundant wind resources are present in the vicinity of the top of the troposphere. For example, because infinite wind energy exists in the air such that energy sufficient enough to satisfy the entire energy demand can be obtained from the air, and this hardly causes environmental destruction, an airborne wind power generation technique has been researched in depth.

An operation principle common to troposphere wind power generators is based on converting wind energy at a high altitude to mechanical energy, and then causing an aerodynamic body, which is capable of converting the mechanical energy to electrical energy which may be generally used for civil and industrial purposes, to continuously fly.

In the simplest, efficient, and safe configuration, the aerodynamic body may be a wing simply having high aerodynamic efficiency that is caused to continuously fly at a height that cannot be reached by an air current generator and at which it cannot be bound to the ground through a highly resistant rope.

Meanwhile, wind power generation systems in the form of being attached to an airship include "airship type power generation device," "airborne wind power generation system using tubular float," or the like, but these techniques have problems in that a high cost is required for a development process itself, and, because a plurality of power generation devices are embedded therein, a weight increases, and a volume of an airship has to be relatively increased in order to increase a floating power, and thus there is a problem in that the required cost increases.

Techniques conventionally proposed in relation to a wind power generation device using an airship have been disclosed in <Patent Document 1> to <Patent Document 3> below.

(Patent Document 1) Korean Patent Registration No. 10-0933514 (Date of Registration: Dec. 15, 2009) (Title of Invention: Wind power generation system using airship floating in the air)

(Patent Document 2) Korean Patent Publication No. 10-2011-0026314 (Date of Publication: Mar. 15, 2011) (Title of Invention: Airship embedded type wind power generation system)

(Patent Document 3) Korean Patent Publication No. 10-2014-0111414 (Date of Publication: Sep. 19, 2014) (Title of Invention: Airship operation system and airship position maintaining method using the same)

DISCLOSURE

Technical Problem

Although the above-listed related arts have an advantage of being capable of producing electricity by floating an airship in the air and generating wind power using the airship, because the related arts use a method in which electrical energy obtained by wind power generation in the airship is transmitted to the ground using a power line connected to the ground or a method in which a flight vehicle is lowered to the ground, produced power is transmitted to a ground system, and then the flight vehicle is moved to the air again, the related arts have a disadvantage in that transfer of produced power is complex and efficiency thereof drops.

Particularly, the method in which power is transmitted by connecting a power line between an airship and a ground system has a disadvantage in that complexity also occurs due to power line installation.

In addition, because the related arts use a method in which an airship having a power generator mounted therein is fixed at a high altitude using a winch and power is generated using strong winds at the high altitude, the related arts have disadvantages in that additional costs for installing the winch occurs, and there is a concern that an accident may occur due to collision between the winch and another float.

Therefore, the present invention has been devised to address the above-described problems that occur in the related arts, and an object of the present invention is to provide a wind power generation system using a jet stream that is capable of producing power by generating wind power using a jet stream without using a winch, converting the wind power to a laser, transmitting the laser to the ground, and then converting the laser to electricity on the ground.

Another object of the present invention is to provide a wind power generation system using a jet stream that is capable of receiving power produced by a flight vehicle, which has produced power in the air, using a relay ship and causing the power to be shot to the ground through a laser so that, even when it is difficult for the flight vehicle, which has produced power through wind power generation, to directly transmit a laser to the ground, the produced power can be stably transmitted to the ground.

Technical Solution

To achieve the above objects, a wind power generation system using a jet stream according to the present invention includes a flight vehicle configured to produce power through wind power generation while floating in the air and autonomously flying without a winch and configured to transmit the produced power to the ground, and a ground reception unit configured to receive a power signal transmitted from the flight vehicle and convert the power signal to electricity.

The flight vehicle may enter a power generation location or escape from the power generation location through buoyancy adjustment.

The flight vehicle may produce power through wind power generation while staying at the top of the troposphere or in the vicinity of the stratosphere.

The flight vehicle may include a propeller configured to rotate in one direction due to the jet stream, a power generator configured to produce power by converting mechanical energy due to a rotational force of the propeller to electrical energy, a power generation control unit configured to control entry or escape into or from the power generation location, a buoyancy adjustment unit configured to increase or decrease buoyancy according to control of the power generation control unit, a laser conversion unit configured to convert power produced by the power generator to a laser, and a laser shooting unit configured to transmit the laser converted by the laser conversion unit to the ground.

Advantageous Effects

According to the present invention, a flight vehicle for generating power can autonomously fly at a high altitude without using a winch, wind power can be generated using strong winds of a jet stream, the wind power can be converted to a laser and transmitted to the ground, and then the laser can be converted to electricity on the ground to produce power. In this way, there is an advantage in that efficiency and convenience in recovering power of the flight vehicle from the ground are improved.

In addition, according to the present invention, power produced by a flight vehicle, which has produced power in the air, can be received using a relay ship and shot to the ground through a laser so that, even when it is difficult for the flight vehicle, that has produced power through wind power generation, to directly transmit a laser to the ground, the produced power can be stably transmitted to the ground.

DESCRIPTION OF REFERENCE NUMERALS

1: flight vehicle
2: jet stream
11: body
20: power generation unit
21: body
22: fin
23: power generator
24: propeller
40: buoyancy adjustment unit
41a, 41b: first and second air membranes
42, 43: first and second storage tanks
44, 45: first and second compressors
46: compressor driving unit
50: laser conversion unit
60: laser shooting unit
70: power generation control unit
100: ground reception unit
101: laser reception unit
102: power conversion unit
103: power storage unit
104: cooling device
200: relay ship

MODES OF THE INVENTION

Hereinafter, a wind power generation system using a jet stream according to exemplary embodiments of the present invention will be described in detail with reference to the accompanying drawings.

Embodiment 1

Figure 1:
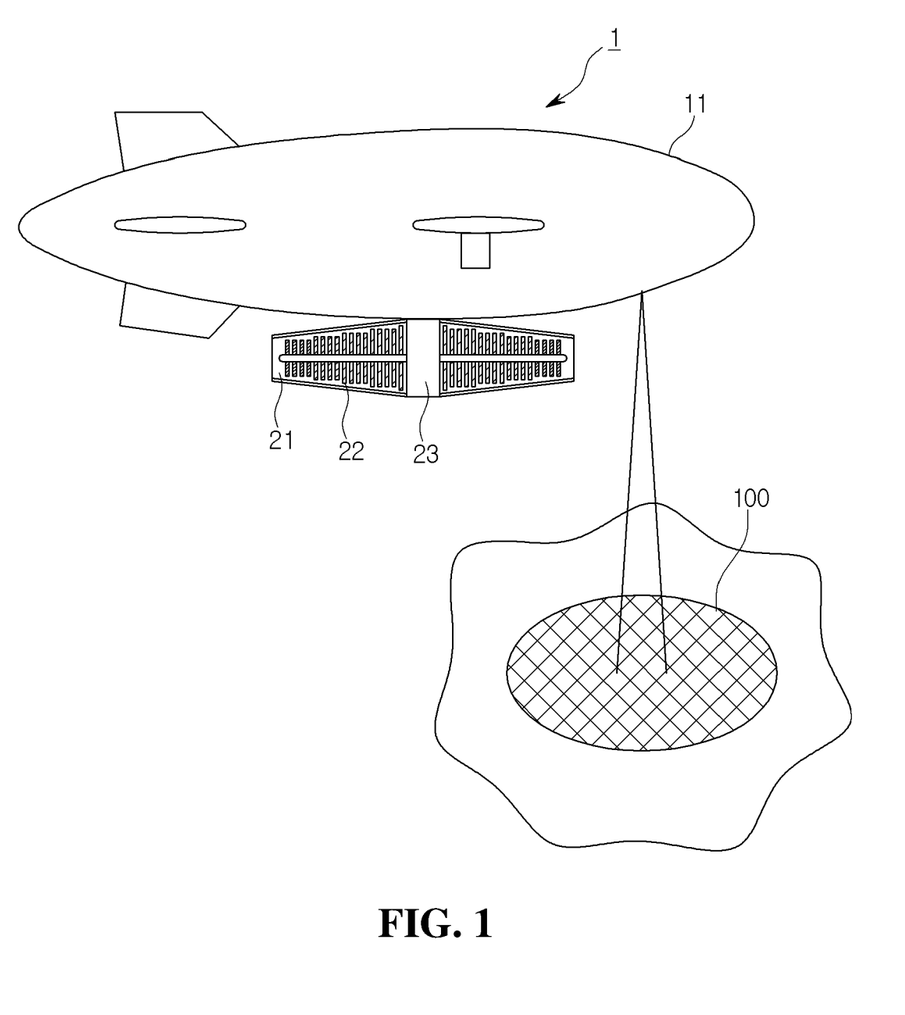
FIG. 1 is a conceptual diagram of a wind power generation system using a jet stream according to the present invention.

FIG. 1 is a configuration diagram of a first embodiment of a wind power generation system using a jet stream according to an exemplary embodiment of the present invention.

The first embodiment of the wind power generation system using a jet stream according to the present invention includes a flight vehicle 1 and a ground reception unit 100.

The flight vehicle 1 produces power through wind power generation while floating in the air and autonomously flying without a winch and serves to transmit the produced power to the ground.

It is desirable that such a flight vehicle 1 enter a power generation location or escape from the power generation location through buoyancy adjustment, and it is more desirable that the flight vehicle 1 convert the produced power to a laser and transmit the laser to the ground. Here, the power generation location refers to an area of a jet stream that occurs at the top of the troposphere or in the vicinity of the stratosphere.

As illustrated in FIGS. 1 to 4, the flight vehicle 1 includes a propeller 24 configured to rotate due to the jet stream, a power generator 23 configured to produce power by converting mechanical energy due to a rotational force of the propeller 24 to electrical energy, a power generation control unit 70 configured to control entry or escape into or from the power generation location, a buoyancy adjustment unit 40 configured to increase or decrease buoyancy according to control of the power generation control unit 70, a laser conversion unit 50 configured to convert power produced by the power generator 23 to a laser, and a laser shooting unit 60 configured to transmit the laser converted by the laser conversion unit 50 to the ground.

Figure 3:
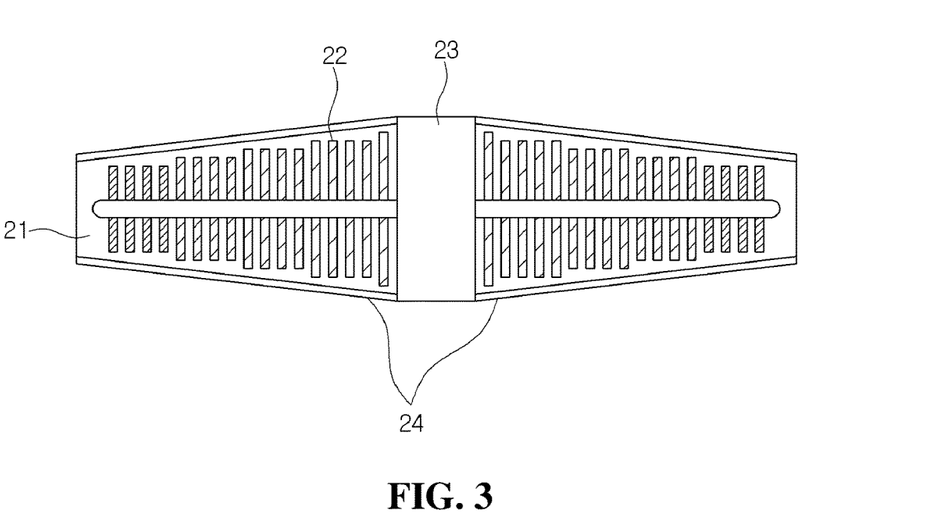
FIG. 3 is a configuration diagram of an embodiment of a power generation unit of FIGS. 1 and 2.

Here, the propeller 24 includes a body 21 and a plurality of fins 22 formed in the body 21 to rotate in the same direction in a headwind or a tailwind and only rotates in a specific direction regardless of a direction of a wind.

Figure 2:
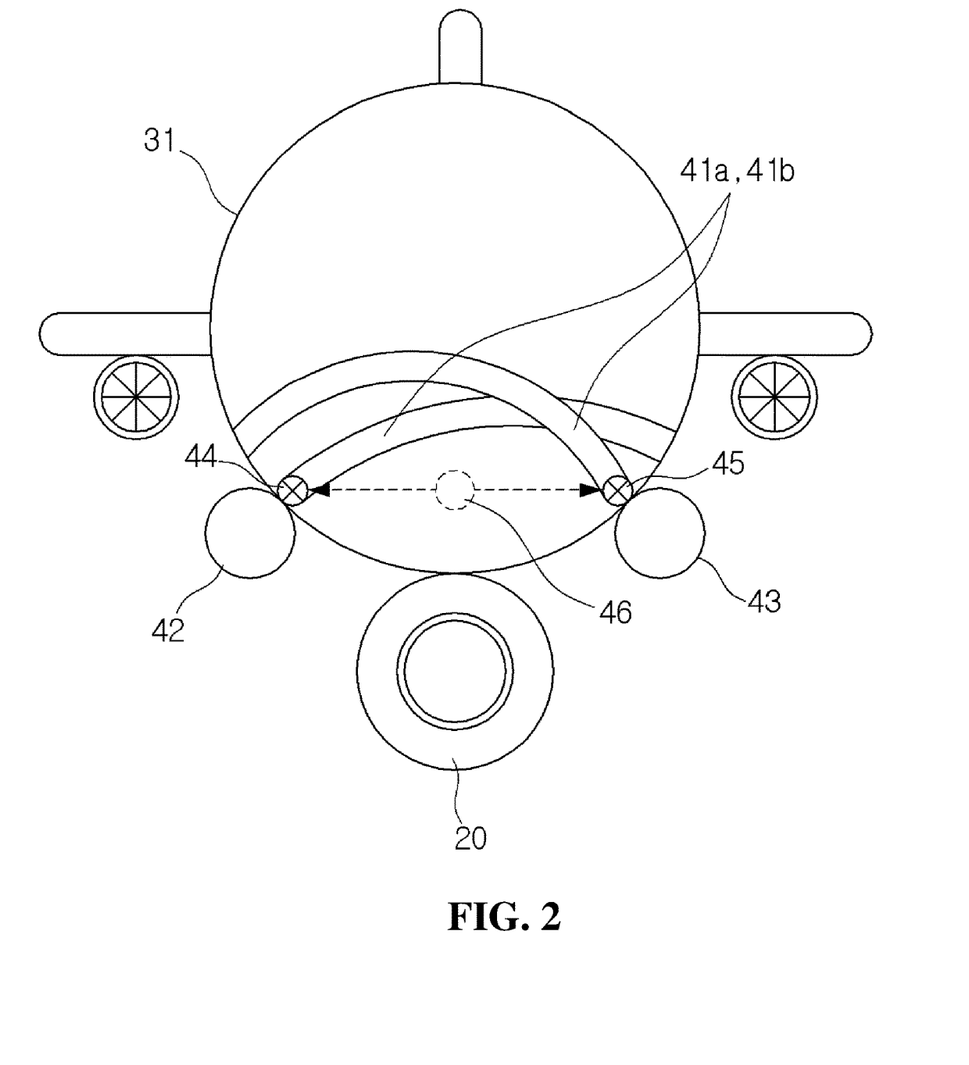
FIG. 2 is a front view of a flight vehicle for wind power generation of FIG. 1.

In addition, the buoyancy adjustment unit 40 includes first and second air membranes 41a and 41b which are air flow paths, a first storage tank 42 configured to store air, a second storage tank 43 configured to store gas lighter than the air, a first compressor 44 configured to inject air into the first air membrane 41a or discharge air from the first air membrane 41a, a second compressor 45 configured to inject or discharge gas which is lighter than the air into or from the second air membrane 41*b*, and a compressor driving unit 46 configured to control driving of the first compressor 44 and the second compressor 45.

In addition, the ground reception unit 100 serves to receive a power signal transmitted from the flight vehicle 1 and convert the power signal to electricity.

Figure 5:
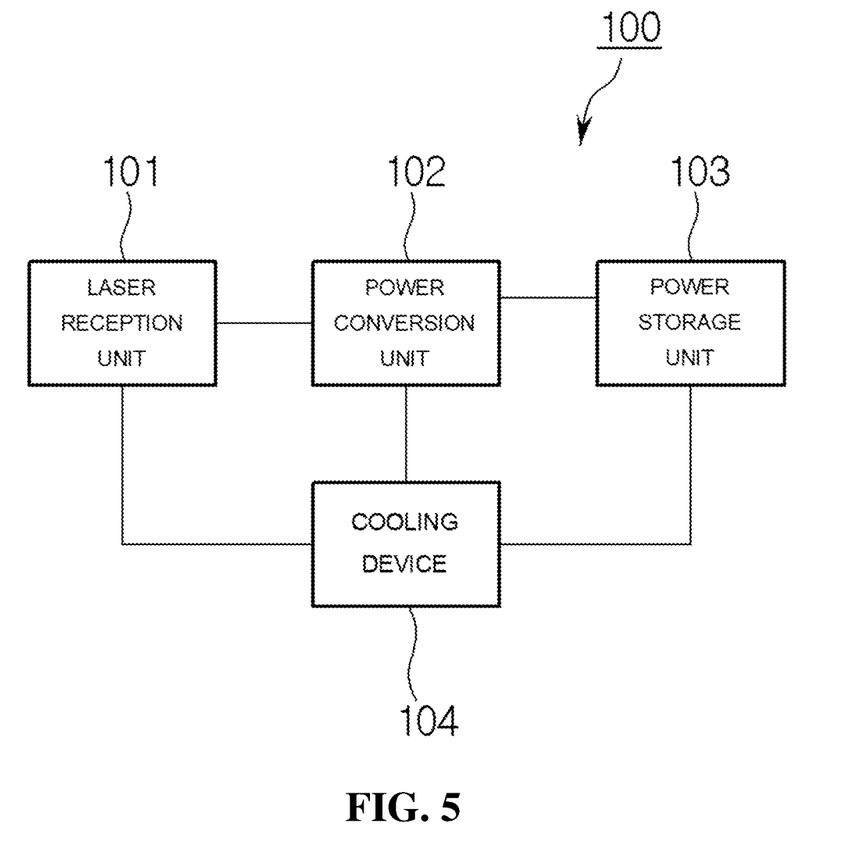
FIG. 5 is a configuration diagram of an embodiment of a ground reception unit of FIG. 1.

As illustrated in FIG. 5, such a ground reception unit 100 includes a laser reception unit 101 configured to receive a power signal transmitted from the flight vehicle 1, a power conversion unit 102 configured to convert a laser received from the laser reception unit 101 to electrical energy, a power storage unit 103 configured to store power converted by the power conversion unit 102, and a cooling device 104 configured to detect an internal temperature of the ground reception unit 100 and, when the detected internal temperature is a set temperature or higher, perform a cooling function to maintain the internal temperature to be suitable.

The first embodiment of the wind power generation system using a jet stream according to the present invention configured as above will be described in detail below.

First, the flight vehicle 1 having power generation equipment and laser shooting equipment embedded therein is caused to enter a jet stream area, which is a power generation location at the top of the troposphere or in the vicinity of the stratosphere which is at a high altitude, without a winch by using a free fall method.

Then, the flight vehicle 1 having wind power generation equipment embedded therein generates wind power while cruising along the jet stream. The power produced by the power generator 23 is converted to a laser by the laser conversion unit 50, a power signal is shot as a laser to the ground by the laser shooting unit 60, and, on the ground, the laser is received and converted back to electricity.

Here, a thickness of the jet stream, which is a strong wind at a high altitude, is 2 to 3 km in average. An average speed of the jet stream is 160 km/h, and a speed at the outer side of the jet stream is about 30 km/h. Using a wind speed difference between the inner side and the outer side of the jet stream, wind power generation is possible by causing the flight vehicle 1 to stay in the jet stream without a winch.

In terms of physics, when the wind speed of the jet stream and the speed of the flight vehicle 1 become equal, because the propeller 24 does not rotate, power cannot be generated. Conversely; when a difference occurs between the wind speed of the jet stream and the speed of the flight vehicle 1, due to the difference, the propeller 24 rotates, and the power generator 23 can generate power.

Therefore, it is important to make a difference between the speed of the flight vehicle 1 and the wind speed of the jet stream.

Figure 8:
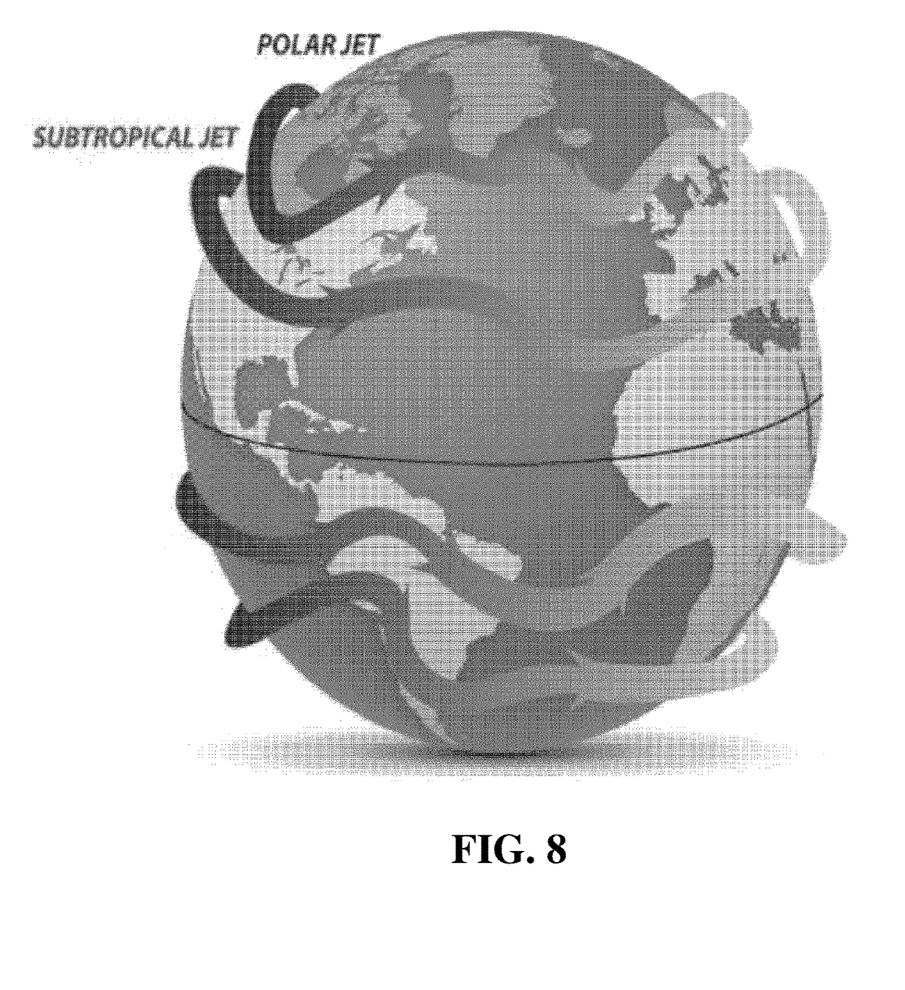
FIG. 8 is an exemplary view of the jet stream.

As illustrated in FIG. 8, two types of jet stream exist. One is a polar jet stream, and the other one is a subtropical jet stream. The former exists between 10 and 13 km above the ground, and the latter exists between 13 and 16 km. A thickness of the jet stream is 3 km in average or mostly smaller than that. Wind speeds at the top and bottom of the jet stream are significantly different. That is, the wind intensity becomes gradually higher (400 km/h in average) toward the inside of the jet stream and is low (130 to 160 km/h) at the outer boundary thereof. Also, a wind speed is about 30 km/h in regions other than the jet stream. The flight vehicle 1 having the power generator mounted therein waits outside the jet stream and then enters the jet stream by almost free falling. In this case, the flight vehicle 1 instantaneously obtains a high speed due to a wind of the jet stream. However, until the speed of the flight vehicle 1 becomes equal to the wind speed of the jet stream, the flight vehicle 1 performs power generation using a speed difference between the flight vehicle 1 and the jet stream. Also, when the speed of the flight vehicle becomes equal to the speed of the jet stream, the flight vehicle escapes from the jet stream. The flight vehicle 1 generates power even outside the jet stream by using a momentum received from the jet stream.

For example, from above or below the jet stream, the flight vehicle 1 enters the jet stream with an acceleration that is lower than the acceleration of free fall (9.8 m/s$^2$) but quite high. Even when, at the moment the flight vehicle 1 enters the jet stream, the flight vehicle 1 obtains a high momentum due to a wind speed of the jet stream, and thus the speed of the flight vehicle 1 increases, the speed of the flight vehicle 1 is lower than the wind speed of the jet stream. With time, the wind speed of the jet stream and the speed of the flight vehicle 1 become eventually equal, and thus it becomes impossible for the flight vehicle 1 to generate power. Until the wind speed of the jet stream and the speed of the flight vehicle 1 become equal, because the speed of the flight vehicle 1 is slower than the wind speed of the jet stream, power generation is performed.

Then, when the speed of the flight vehicle 1 and the wind speed of the jet stream become equal, the flight vehicle 1 escapes from the jet stream. In this case, the speed of the flight vehicle 1 that has escaped from the jet stream becomes higher than a wind speed outside the jet stream due to the momentum obtained from the jet stream. Because of this, since the speed of the flight vehicle 1 is higher than that of the outside wind, the flight vehicle 1 is able to generate power.

When the speed of the outside wind of the flight vehicle 1 and the speed of the flight vehicle 1 become equal, the flight vehicle 1 enters the jet stream again. The flight vehicle 1 generates power by repeatedly performing such a process.

Figure 6:
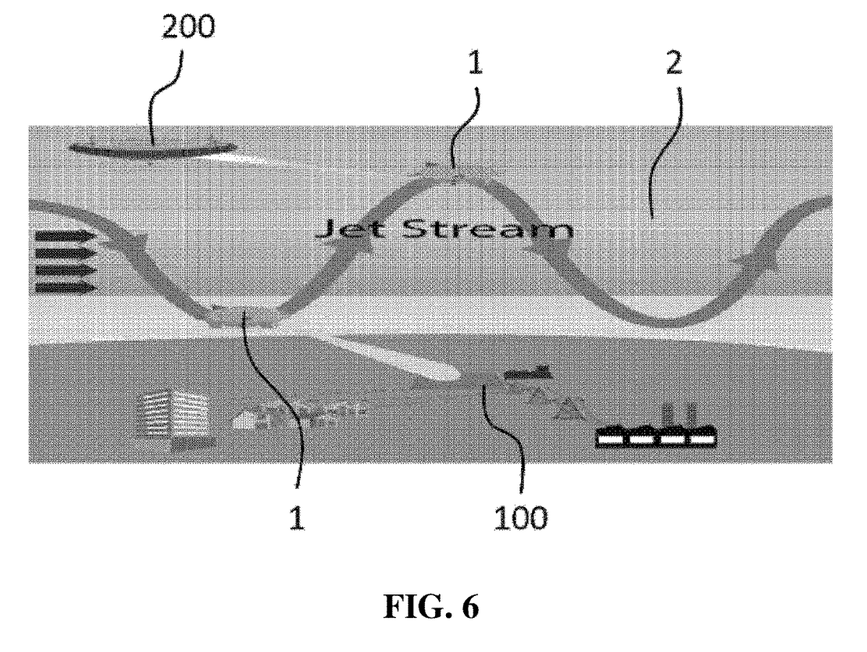
FIGS. 6 and 7 are exemplary views in which the flight vehicle performs wind power generation by entering into and escaping from a jet stream area in the present invention.
Figure 7:
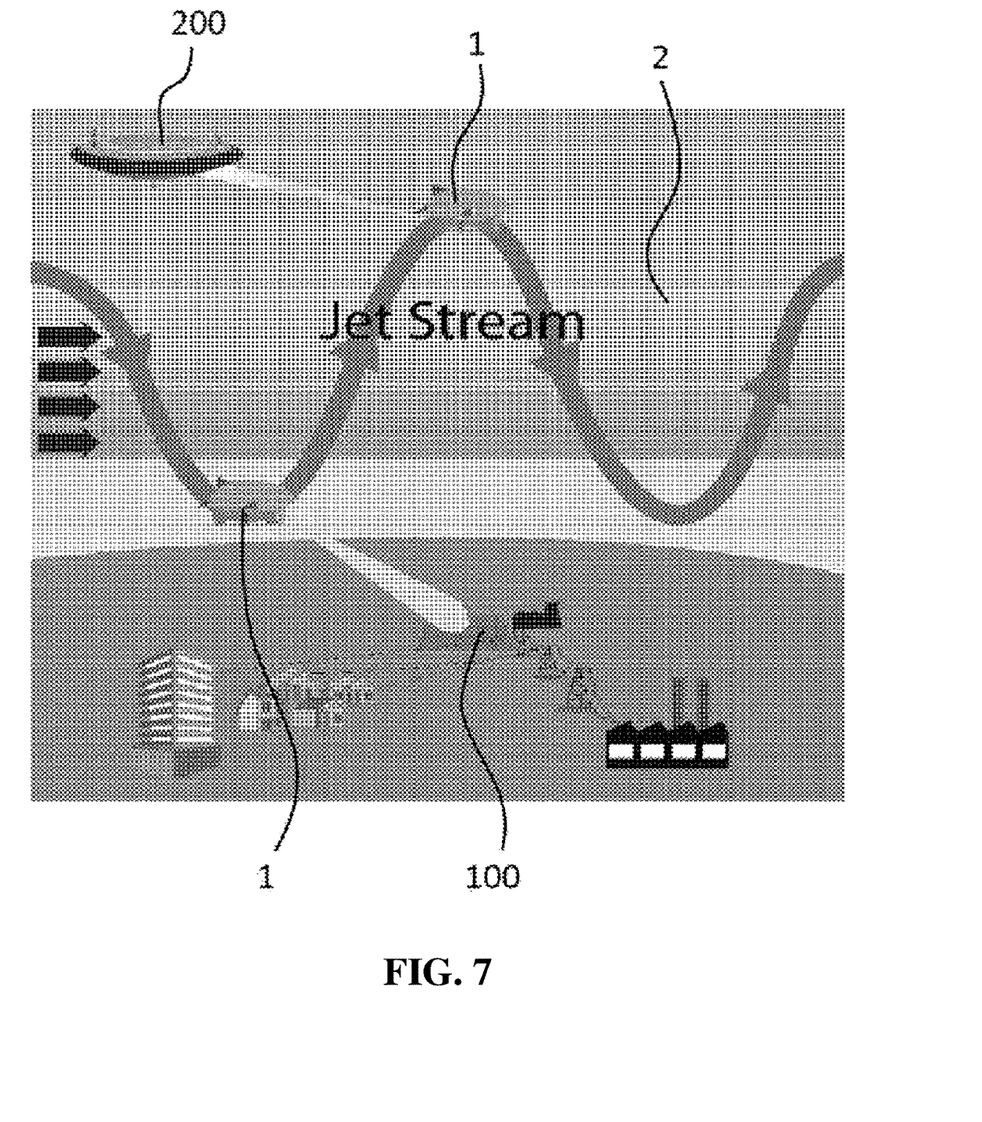

FIGS. 6 and 7 are exemplary views of the flight vehicle 1 performing power generation while repeating the process of entering the jet stream and then escaping from the jet stream.

The flight vehicle 1 may also escape from the jet stream from the middle of the jet stream, i.e., at a point in time at which the wind speed of the jet stream and the speed of the flight vehicle 1 become equal, instead of passing through the jet stream from top to bottom, as necessary.

FIGS. 6 and 7 are examples in which the flight vehicle 1 enters the jet stream through the top of the jet stream and escapes from the jet stream through the bottom of the jet stream.

Here, when the speed of the flight vehicle 1 reaches the speed of the jet stream, instead of escaping from the jet stream through the bottom of the jet stream, the flight vehicle 1 may also escape from the jet stream through the top of the jet stream right away. In the jet stream, the wind intensity becomes gradually higher from the outer boundary to the center. The flight vehicle 1 may also enter the jet stream through the outer boundary thereof horizontally and then escape from the jet stream through the outer boundary when the speed of the flight vehicle 1 becomes equal to the speed of the jet stream.

As a result, the flight vehicle 1 is able to generate power until the speed of the flight vehicle 1 becomes equal to the wind speed of the jet stream. Such flight vehicles may also fly to perform optimal power generation by itself due to an autonomous flying system. Here, it is desirable that the autonomous flying system fly along an optimal flight line in comprehensive consideration of a speed of the flight vehicle 1, a wind speed, a flight time inside the jet stream, an amount of generated power, and the like.

For example, when it is assumed that the wind speed of the jet stream is 160 km/h and the speed of the flight vehicle 1 is 100 km/h, because a speed difference between the flight vehicle 1 and the wind of the jet stream is 60 km/h (=160–100), the flight vehicle 1 generates power using the power generator 23, which is the power generation equipment mounted in the flight vehicle 1. Here, the wind direction of the jet stream and the moving direction of the flight vehicle 1 are the same.

Further, when it is assumed that the wind speed of the jet stream is 160 km/h and the speed of the flight vehicle 1 is 160 km/h, because a speed difference between the flight vehicle 1 and the wind of the jet stream is 0 km/h (=160–160), it becomes impossible for the flight vehicle 1 to generate power. In this case, it is desirable that the flight vehicle 1 escape from the jet stream.

The flight vehicle 1 that has escaped from the jet stream has a speed of 160 km/h due to the momentum obtained from the jet stream, the speed of the outside wind of the jet stream is 30 km/h, and thus, a speed difference between the flight vehicle 1 and the outside wind of the jet stream is 130 km/h (=160-30). Therefore, the flight vehicle 1 generates power using the power generator 23, which is the power generation equipment mounted in the flight vehicle 1. Here, the outside wind direction of the jet stream and the moving direction of the flight vehicle 1 are the same.

The flight vehicle 1 generates power while repeatedly performing such an operation.

Here, simultaneously using a headwind and a tailwind of the flight vehicle 1 and rapidly varying buoyancy of the flight vehicle 1 are important.

For the former, in the present invention, as illustrated in FIG. 3, the propeller 24 is implemented to rotate in one direction regardless of whether a wind is a headwind or a tailwind. That is, propellers 24 having the same shape are mounted at both sides with respect to the power generator 23, and the plurality of fins 22 are formed at a portion of the body 21 of each propeller 24 so that the propeller 24 only rotates in one direction regardless of whether a wind is a headwind or a tailwind.

Next, for the latter, by rapidly increasing or decreasing the buoyancy, the flight vehicle 1 is induced to generate a large amount of power within the shortest distance after entering the jet stream.

For example, FIGS. 6 and 7 are examples in which the flight vehicle 1 generates power while repeating the process of entering into the jet stream and then escaping to the outside of the jet stream.

FIG. 6 illustrates the form in which the flight vehicle 1 generates power while moving a long distance, and FIG. 7 illustrates the form in which the flight vehicle 1 generates power while moving a short distance. In both FIGS. 6 and 7, the flight vehicle 1 generates power while moving in the form of a sine wave.

FIG. 6 illustrates a sine wave with a long wavelength, and FIG. 7 illustrates a sine wave with a relatively shorter wavelength as compared with FIG. 6. When it is assumed that the flight vehicle 1 has moved the same distance, the flight vehicle 1 may generate a relatively larger amount of power when the wavelength is short as compared with when the wavelength is long.

Therefore, in order to implement a sine wave with a short wavelength, it is necessary to rapidly increase or decrease the buoyancy. For buoyancy adjustment, in the present invention, the buoyancy adjustment unit 40 is provided at a predetermined location in the flight vehicle 1. In order to rapidly increase or decrease the buoyancy, a ballonet, which is generally used, is used, or tanks storing air and a gas lighter than the air (for example, helium or hydrogen) are used.

FIG. 2 is the front view of the flight vehicle 1. The first and second air membranes 41a and 41b, which are air flow paths, are formed inside a body 31 of the flight vehicle 1, the first storage tank 42 configured to store air and the second storage tank 43 configured to store a gas lighter than the air are respectively mounted at a lower left side and a lower right side of the body 31. Also, a first valve 44 configured to inject air into the first air membrane 41a or discharge air from the first air membrane 41a is installed at a predetermined location, and a second valve 45 configured to inject or discharge a gas lighter than the air into or from the second air membrane 41b is installed at a predetermined location. Also, a valve driving unit 46 configured to control opening and closing of the first valve 44 and the second valve 45 is provided at a predetermined location in the body 31.

Here, the reference number 20 indicates a power generation unit.

Also, although not illustrated in the drawings, it is assumed that a heater configured to heat a gas (air, helium, hydrogen) is additionally included. It is desirable that the heater use electricity generated by the power generator 23.

When it is attempted to rapidly increase the buoyancy, the heater is operated to the maximum, and in this case, a gas lighter than the expanding air is injected into the second air membrane 41b. When it is attempted to rapidly decrease the buoyancy, the air in the first storage tank 42 is injected to the inside of the flight vehicle 1, i.e., the first air membrane 41a, to decrease the buoyancy.

Here, two air membranes, i.e., the first and second air membranes 41a and 41b, for forming a flow path along which air and a gas lighter than the air flow are provided inside the flight vehicle 1. Because the air membranes are separated from each other by a partition or the like, the air and the gas lighter than the air are not mixed with each other.

When the flight vehicle 1 gains buoyancy again (when the buoyancy is increased), air injected into the first air membrane 41a inside the flight vehicle 1 is suctioned into the first storage tank 42 using the first compressor 44, and the gas lighter than the air that is stored in the second storage tank 43 is injected into the second air membrane 41b using the second compressor 45 in order to increase the buoyancy. Here, because the flight vehicle 1 is located at a height of 10 km above the ground, a temperature of the flight vehicle 1 is about −50° C. When the cold air enters the flight vehicle 1, a temperature of the gas lighter than the air that is located inside the flight vehicle 1 further drops. In this case, the gas lighter than the air is introduced in a large amount into the second air membrane 41b, and thus the buoyancy of the flight vehicle 1 increases more rapidly.

That is, in order to increase the buoyancy of the flight vehicle 1, the compressor driving unit 46 may control driving of the first compressor 44 so that air is discharged from the first air membrane 41a and stored in the first storage tank 42 and may control driving of the second compressor 45 so that the gas lighter than the air is injected from the second storage tank 43 to the second air membrane 41b.

Also, in order to decrease the buoyancy of the flight vehicle 1, the compressor driving unit 46 may control driving of the second compressor 45 so that the gas lighter than the air is discharged from the second air membrane 41b and stored in the second storage tank 43 and may control driving of the first compressor 44 so that the air is injected from the first storage tank 42 to the first air membrane 41a.

In this way, by causing the flight vehicle 1 to move in short wavelengths by rapidly increasing or decreasing the buoyancy of the flight vehicle 1 using the two tanks, the amount of generated power can be increased even when moving a short distance.

Figure 4:
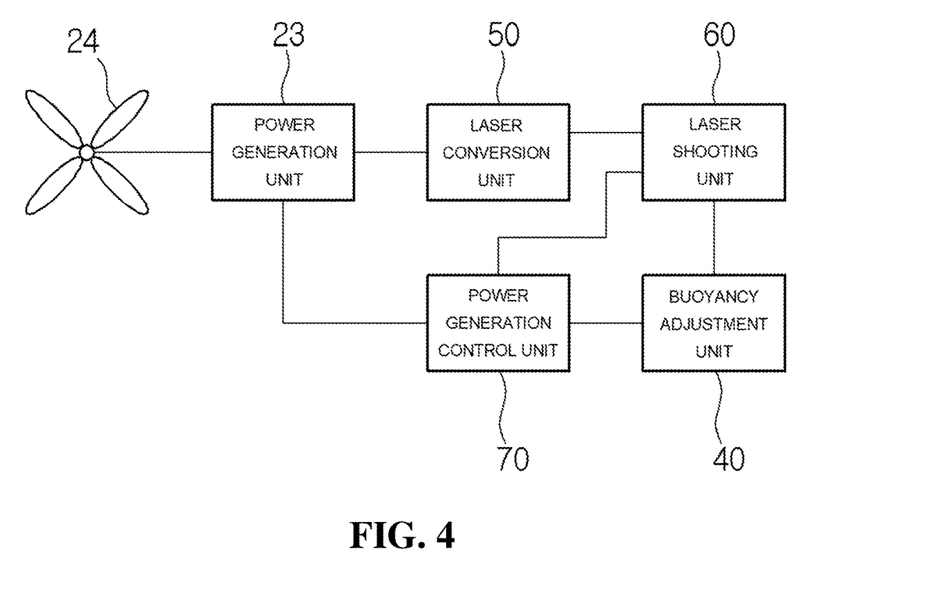
FIG. 4 is a block diagram of an inner portion of the flight vehicle of FIG. 1.

Meanwhile, power produced by the wind power generation using the above method is converted to a laser by the laser conversion unit 50. Here, the laser is formed as a result of amplifying light by the same principle as the microwave amplification by stimulated emission. The converted laser is transmitted to the ground by the laser shooting unit 60. The transmitted laser is transmitted as a power signal to the ground.

Here, a temperature rise is caused in the flight vehicle 1 during the power generation, laser conversion, and laser shooting. Therefore, in order to prevent the case in which the flight vehicle 1 explodes or a device inside the flight vehicle 1 does not operate normally due to such a temperature rise, it is desirable that a cooling device be included, and the internal temperature of the flight vehicle 1 be always adjusted to a suitable temperature through the cooling function. That is, by detecting an internal temperature of the flight vehicle 1 using a temperature sensor, comparing the detected internal temperature with a preset reference temperature, and, when the internal temperature is higher than the reference temperature, lowering the internal temperature to be close to the reference temperature through the cooling function, the cooling device always maintains the internal temperature of the flight vehicle 1 to be suitable.

In the ground reception unit 100 located on the ground, the laser reception unit 101 receives the laser transmitted from the flight vehicle 1, and the power conversion unit 102 converts the received laser to electrical energy. Here, the laser reception unit 101 may be implemented using a solar cell.

The power converted by the power conversion unit 102 is stored in the power storage unit 103 and then distributed to where the power is needed. It is also possible to generate profits by selling the power to power supply organizations that supply power as needed.

It is desirable that the ground reception unit 100 also include the cooling device 104 so that the internal temperature of the ground reception unit 100 is maintained to be suitable.

Because the laser transmitted from the flight vehicle 1 may cause harm to the human body, it is desirable to install the ground reception unit 100 at a desolate place.

Embodiment 2

According to the above-described first embodiment, efficiency of wind power generation can be promoted under the assumption that a laser can always be optimally transmitted to the ground from the flight vehicle 1 located in the stratosphere. Because a jet stream is a very strong wind, it may be difficult for the flight vehicle 1 cruising along with the jet stream to accurately shoot a laser to the ground reception unit.

Therefore, in order to prepare for such a case, in the present invention, a relay ship 200 is placed outside the jet stream area, separate from the flight vehicle 1, and power produced from the flight vehicle 1 is relayed to the ground.

Referring to FIGS. 6 and 7, the second embodiment of the wind power generation system using a jet stream according to the present invention utilizes the flight vehicle 1 of the first embodiment without any change except that, in the second embodiment, the flight vehicle 1 transmits the produced power to the relay ship 200 located outside the jet stream area instead of converting the produced power to a laser and transmitting the laser to the ground.

Here, the relay ship 200 is interposed between the flight vehicle 1 and the ground reception unit 100 and serves to receive a power signal transmitted from the flight vehicle 1, convert the power signal to electricity, convert the electricity back to the power signal, and transmit the power signal to the ground reception unit 100.

Because the flight vehicle 1 is formed of the same configuration as that of the flight vehicle 1 of the first embodiment and thus produces power through wind power generation by performing the same operation as the flight vehicle 1 of the first embodiment, description of the power producing operation of the flight vehicle 1 will be omitted.

The relay ship 200 may include a solar cell configured to receive a power signal transmitted from the flight vehicle 1, a power conversion unit configured to convert the power signal received by the solar cell to electricity, a laser conversion unit configured to convert the electricity converted by the power conversion unit to a laser, and a laser shooting unit configured to transmit the laser converted by the laser conversion unit to the ground. Here, it is desirable that an outer surface of the relay ship 200 be surrounded by the solar cell.

The relay ship 200 is located in the stratosphere like the flight vehicle 1 and is fixed to a specific location outside the jet stream area. In order to prepare for the case in which it is difficult to directly transmit a laser from the flight vehicle 1 to the ground reception unit 100, the relay ship 200 receives a laser transmitted from the flight vehicle 1.

The relay ship 200 receives the laser transmitted from the flight vehicle 1 using the solar cell, and the power conversion unit converts the received laser to electrical energy. Then, the laser conversion unit converts the generated electrical energy to a laser. Here, the laser is formed as a result of amplifying light by the same principle as the microwave amplification by stimulated emission. The converted laser is transmitted to the ground by the laser shooting unit.

Here, a temperature rise is also caused in the relay ship 200 during the laser reception, laser conversion, and laser shooting. Therefore, in order to prevent the case in which the relay ship 200 explodes or a device inside the relay ship 200 does not operate normally due to such a temperature rise, it is desirable that a cooling device be included, and the internal temperature of the relay ship 200 be always adjusted to a suitable temperature through the cooling function.

In the ground reception unit 100 located on the ground, the laser reception unit 101 receives the laser transmitted from the relay ship 200, and the power conversion unit 102 converts the received laser to electrical energy. Here, the laser reception unit 101 may be implemented using a solar cell.

The power converted by the power conversion unit 102 is stored in the power storage unit 103 and then distributed to where the power is needed. It is also possible to generate profits by selling the power to power supply organizations that supply power as needed.

It is desirable that the ground reception unit 100 also include the cooling device 104 so that the internal temperature of the ground reception unit 100 is maintained to be suitable.

Because the laser transmitted from the relay ship 200 may cause harm to the human body, it is desirable to install the ground reception unit 100 at an isolated place.

The invention devised by the present inventor has been described in detail above according to the embodiments thereof, but the present invention is not limited to the embodiments, and it is self-evident to those of ordinary skill in the art that the various changes may be made to the present invention within the scope not departing from the gist thereof.

The invention claimed is:

1. A wind power generation system using a jet stream, which is a system that generates wind power using a jet stream, the wind power generation system comprising:
   a flight vehicle configured to produce power through wind power generation while floating in the air and autonomously flying without a winch and configured to transmit the produced power to the ground; and
   a ground reception unit configured to receive a power signal transmitted from the flight vehicle and convert the power signal to electricity, wherein:
   the flight vehicle enters a power generation location or escapes from the power generation location through buoyancy adjustment;
   the flight vehicle produces power through wind power generation while staying at the top of the troposphere or in the vicinity of the stratosphere where the jet stream is generated; and
   the flight vehicle includes a propeller configured to rotate in one direction due to the jet stream, a power generator configured to produce power by converting mechanical energy due to a rotational force of the propeller to electrical energy, a power generation control unit configured to control entry or escape into or from the power generation location, a buoyancy adjustment unit configured to increase or decrease buoyancy according to control of the power generation control unit, a laser conversion unit configured to convert power produced by the power generator to a laser, and a laser shooting unit configured to transmit the laser converted by the laser conversion unit to the ground.

2. The wind power generation system of claim 1, wherein the propeller includes a body and a plurality of fins formed in the body to rotate in the same direction in a headwind or a tailwind and only rotates in a specific direction regardless of a direction of a wind.

3. The wind power generation system of claim 1, wherein the flight vehicle converts the produced power to a laser and transmits the laser to the ground.

4. The wind power generation system of claim 1, wherein the buoyancy adjustment unit includes first and second air membranes, which are air flow paths, a first storage tank configured to store air, a second storage tank configured to store gas lighter than the air, a first compressor configured to inject air into the first air membrane or discharge air from the first air membrane, a second compressor configured to inject or discharge gas which is lighter than the air into or from the second air membrane, and a compressor driving unit configured to control driving of the first compressor and the second compressor.

5. The wind power generation system of claim 1, wherein the ground reception unit includes a laser reception unit configured to receive a power signal transmitted from the flight vehicle, a power conversion unit configured to convert a laser received from the laser reception unit to electrical energy, and a power storage unit configured to store power converted by the power conversion unit.

6. A wind power generation system using a jet stream, which is a system that generates wind power using a jet stream, the wind power generation system comprising:
   a flight vehicle configured to produce power through wind power generation while floating in the air and autonomously flying without a winch and configured to transmit the produced power;
   a relay ship configured to receive a power signal transmitted from the flight vehicle, convert the power signal to electricity, convert the electricity back to the power signal, and transmit the power signal to the ground; and
   a ground reception unit configured to receive a power signal transmitted from the relay ship and convert the power signal to electricity, wherein:
   the flight vehicle enters a power generation location or escapes from the power generation location through buoyancy adjustment;
   the flight vehicle converts the power signal to a laser and transmits the laser and produces power through wind power generation while staying at the top of the troposphere or in the vicinity of the stratosphere where the jet stream is generated; and
   the flight vehicle includes a propeller configured to rotate in one direction due to the jet stream, a power generator configured to produce power by converting mechanical energy due to a rotational force of the propeller to electrical energy, a power generation control unit configured to control entry or escape into or from the power generation location, a buoyancy adjustment unit configured to increase or decrease buoyancy according to control of the power generation control unit, a laser conversion unit configured to convert power produced by the power generator to a laser, and a laser shooting unit configured to transmit the laser converted by the laser conversion unit to the ground.

7. The wind power generation system of claim 6, wherein the propeller includes a body and a plurality of fins formed in the body to rotate in the same direction in a headwind or a tailwind and only rotates in a specific direction regardless of a direction of a wind.

8. The wind power generation system of claim 6, wherein the buoyancy adjustment unit includes first and second air membranes, which are air flow paths, a first storage tank configured to store air, a second storage tank configured to store gas lighter than the air, a first compressor configured to inject air into the first air membrane or discharge air from the first air membrane, a second compressor configured to inject or discharge gas which is lighter than the air into or from the second air membrane, and a compressor driving unit configured to control driving of the first compressor and the second compressor.

9. The wind power generation system of claim 6, wherein the ground reception unit includes a laser reception unit configured to receive a power signal transmitted from the flight vehicle, a power conversion unit configured to convert a laser received from the laser reception unit to electrical energy, and a power storage unit configured to store power converted by the power conversion unit.

* * * * *